(12) United States Patent
Chen et al.

(10) Patent No.: US 11,016,608 B2
(45) Date of Patent: May 25, 2021

(54) TOUCH DISPLAY CONTROL APPARATUS AND TOUCH DISPLAY APPARATUS

(71) Applicant: Chipone Technology (Beijing) Co., Ltd., Beijing (CN)

(72) Inventors: Tianhao Chen, Beijing (CN); Youqiao Xie, Beijing (CN)

(73) Assignee: Chipone Technology (Beijing) Co., Ltd., Beijing (CN)

( * ) Notice: Subject to any disclaimer, the term of this patent is extended or adjusted under 35 U.S.C. 154(b) by 0 days.

(21) Appl. No.: 16/628,022

(22) PCT Filed: Mar. 19, 2019

(86) PCT No.: PCT/CN2019/078700
§ 371 (c)(1),
(2) Date: Dec. 31, 2019

(87) PCT Pub. No.: WO2019/184767
PCT Pub. Date: Oct. 3, 2019

(65) Prior Publication Data
US 2020/0218422 A1    Jul. 9, 2020

(30) Foreign Application Priority Data

Mar. 27, 2018    (CN) .......................... 201810256895.3

(51) Int. Cl.
*G06F 3/041*    (2006.01)
*G06F 3/044*    (2006.01)

(52) U.S. Cl.
CPC ........ *G06F 3/04184* (2019.05); *G06F 3/0412* (2013.01); *G06F 3/0446* (2019.05)

(58) Field of Classification Search
CPC .. G02F 1/13338; G06F 3/0412; G06F 3/0416; G06F 3/04184; G06F 3/0418;
(Continued)

(56) References Cited

U.S. PATENT DOCUMENTS

2005/0225546 A1* 10/2005 Akimoto .............. G09G 3/3648
345/207
2010/0302227 A1* 12/2010 Sasaki .................. G06F 3/0447
345/211
(Continued)

FOREIGN PATENT DOCUMENTS

CN    103488325    1/2014
CN    103513813    1/2014
(Continued)

*Primary Examiner* — Michael J Eurice
(74) *Attorney, Agent, or Firm* — Treasure IP Group, LLC (57) ABSTRACT

This application discloses a touch display control apparatus and a touch display apparatus. The touch display control apparatus comprises: a touch control module for touch detection, wherein the touch control module comprises touch detection channels, and performs the touch detection according to touch sensing signals received through the touch detection channels; a display control module for display control, wherein the display control and touch detection are performed in time sharing manner; selection modules for selectively connecting the touch detection channels or a common voltage signal to a touch display panel, wherein nodes connecting the selection modules and the touch display panel are compensation nodes, the touch display control apparatus further comprises compensation modules respectively connected to the compensation nodes, each compensation module counteract an interference voltage coupled to a corresponding compensation node when the interference voltage exceeds a preset value, thereby avoiding a horizontal or vertical stripe in displayed images.

12 Claims, 9 Drawing Sheets

(58) Field of Classification Search
CPC ... G06F 3/0443; G06F 3/0446; G09G 3/3611; G09G 3/3648; G09G 3/3655; G09G 3/3696; G09G 2300/0426; G09G 2310/08; G09G 2320/0209; G09G 2320/0223; G09G 2354/00
See application file for complete search history.

(56) References Cited

U.S. PATENT DOCUMENTS

| | | | | |
|---|---|---|---|---|
| 2011/0080385 | A1* | 4/2011 | Kitagishi | G11C 19/28 345/204 |
| 2012/0206408 | A1* | 8/2012 | Brown | G06F 3/044 345/174 |
| 2013/0076648 | A1* | 3/2013 | Krah | G06F 3/044 345/173 |
| 2013/0335342 | A1* | 12/2013 | Kim | G06F 3/0446 345/173 |
| 2013/0335366 | A1* | 12/2013 | Lee | G06F 3/0416 345/174 |
| 2016/0071452 | A1* | 3/2016 | Nho | G09G 3/3614 345/214 |
| 2016/0260396 | A1* | 9/2016 | Miyake | G06F 3/0416 |
| 2017/0315652 | A1* | 11/2017 | Pourbigharaz | G06F 1/08 |
| 2018/0004329 | A1* | 1/2018 | So | G06F 3/0416 |
| 2018/0046325 | A1* | 2/2018 | Kim | G06F 3/0412 |
| 2018/0107309 | A1* | 4/2018 | Endo | G09G 3/3614 |
| 2018/0307337 | A1* | 10/2018 | Ahn | G06F 3/0416 |
| 2019/0027507 | A1* | 1/2019 | Toyotaka | H01L 27/124 |
| 2019/0064977 | A1* | 2/2019 | Feng | G06F 3/0416 |
| 2019/0095001 | A1* | 3/2019 | Xie | G06F 3/0418 |
| 2019/0129560 | A1* | 5/2019 | Li | G06F 3/0416 |
| 2019/0279600 | A1* | 9/2019 | Chan | G06F 3/0412 |
| 2020/0183521 | A1* | 6/2020 | Mayumi | G06F 3/047 |

FOREIGN PATENT DOCUMENTS

| | | |
|---|---|---|
| CN | 107562279 | 1/2018 |
| CN | 107577365 | 1/2018 |
| CN | 107728832 | 2/2018 |
| CN | 107742506 | 2/2018 |
| CN | 108320720 | 7/2018 |
| CN | 208014351 | 10/2018 |
| CN | 109471563 A | 3/2019 |
| CN | 109828686 A | 5/2019 |

\* cited by examiner

TOUCH DISPLAY CONTROL APPARATUS AND TOUCH DISPLAY APPARATUS

CROSS-REFERENCE TO RELATED APPLICATIONS

This application claims priority to Chinese Patent Application No. 201810256895.3, filed on Mar. 27, 2018, and entitled "TOUCH DISPLAY CONTROL APPARATUS AND TOUCH DISPLAY APPARATUS", which is incorporated herein by reference in its entirety.

BACKGROUND OF THE DISCLOSURE

Field of Technology

The present invention relates to the field of touch control display technologies, and more specifically, to a touch display control apparatus and a touch display apparatus.

Description of the Related Art

With a technical progress, touch display technologies are applied to more fields, and higher requirements are also posed on touch display quality. A traditional touch display apparatus includes a touch display panel and a touch display control apparatus. A display panel and a touch panel are integrated on the touch display panel. A touch control electrode on the touch panel is led out by using a lead, so as to connect to the touch display control apparatus. However, in the prior art, a touch sensing voltage at a connection point between the touch panel and the touch display control apparatus is interfered with due to wiring on the panel, a circuit structure in a chip, and the like. Especially for a touch and display driver integration (TDDI) touch display apparatus, display driving and touch detection are performed in a time sharing manner, and a touch control line of the touch display panel is connected to a common voltage VCOM in a display stage. However, due to existence of the foregoing interference, it is difficult to maintain an ideal voltage range at the connection point. Consequently, a displayed image is affected.

SUMMARY OF THE DISCLOSURE

In view of this, the present invention mainly provides a touch display control apparatus and a touch control apparatus, to compensate for a voltage fluctuation at connection points between the touch display control apparatus and a touch display panel.

According to a first aspect of the present invention, a touch display control apparatus is provided, comprising: a touch control module configured to perform touch detection, wherein the touch control module comprises a plurality of touch detection channels, and performs the touch detection in accordance with a plurality of touch sensing signals which are received through the plurality of touch detection channels, respectively; a display control module configured to perform display control, wherein the display control module and the touch control module perform display control and touch detection in a time sharing manner; and a plurality of selection modules configured to selectively connect the plurality of touch detection channels or a common voltage signal to a touch display panel, wherein a plurality of nodes connecting the plurality of selection modules and the touch display panel are served as compensation nodes, the touch display control apparatus further comprises a plurality of compensation modules respectively connected to the plurality of compensation nodes, and each compensation module is configured to counteract an interference voltage coupled to a corresponding one of the compensation nodes when the interference voltage exceeds a preset value.

Preferably, each compensation module comprises a first transistor and a second transistor that are connected in series between a first supply voltage and a second supply voltage, a first electrode of the first transistor and a first electrode of the second transistor are connected to a corresponding compensation node, a control electrode of the first transistor and a control electrode of the second transistor receive a first control signal, and a second electrode of the first transistor and a second electrode of the second transistor respectively receive the first supply voltage and the second supply voltage.

Preferably, each selection module comprises: a selection switch configured to connect a corresponding one of the plurality of touch detection channels or an output end of an amplifier to a corresponding one of the compensation nodes under control of a second control signal.

Preferably, the first control signal is the common voltage signal.

Preferably, the touch control module further comprises the amplifier, wherein a first input end of the amplifier receives the common voltage signal, a second input end is connected to the output end, and the output end of the amplifier is configured to provide the common voltage signal to the plurality of selection modules and the compensation modules.

Preferably, the first transistor comprises an N-type MOS transistor, and the second transistor comprises a P-type MOS transistor.

Preferably, the first electrodes are sources, the second electrodes are drains, and the control electrodes are gates.

Preferably, the first supply voltage is greater than the second supply voltage.

Preferably, the touch display control apparatus is a control apparatus for a touch and display driver integration device.

According to a second aspect, a touch display chip is provided, comprising the foregoing touch display control apparatus mentioned in any of the above embodiments.

According to a third aspect of the present invention, a touch display apparatus is provided, comprising: the touch display panel comprising a plurality of touch control electrodes, where the plurality of touch control electrodes are led out from the touch display panel by using a plurality of touch control lines; and the foregoing touch display control apparatus mentioned in any of the above embodiments, wherein the touch control module is connected to the plurality of touch control lines, each touch detection channel is connected to a corresponding touch control line, and nodes connecting the touch detection channels to the touch control lines are served as the compensation nodes.

Compared with the prior art, a plurality of compensation modules that each comprise two different types of MOS transistors are added to the touch display control apparatus and the touch control apparatus that are provided in the present invention. Within a display stage, a part of a voltage fluctuation that exceeds the preset value and that is at a connection point between the touch display control apparatus and the touch display panel is counteracted by the corresponding compensation module, and a voltage at the connection point between the touch display control apparatus and the touch display panel is pulled back to an ideal voltage range within a relatively short time, to reduce impact of the voltage fluctuation. In this way, a common voltage has a consistent driving capability at each connection point, thereby avoiding a horizontal or vertical stripe during image display caused by inconsistent driving capabilities of the common voltage.

BRIEF DESCRIPTION OF THE DRAWINGS

The above and other objects, features, and advantages of the present invention will become clearer based on the description of embodiments of the present invention with reference to the following accompanying drawings. In figures.

DESCRIPTION OF THE EMBODIMENTS

The present invention will be described in more detail below with reference to the accompanying drawings. In the various figures, same elements are denoted by similar reference numerals. For the sake of clarity, the various parts in the figures are not drawn to scale. In addition, some well-known content may not be described.

Many specific details of the present invention are described below, so that the present invention is more clearly understood. However, exactly as a person skilled in the art can understand, the present invention may not be implemented according to these specific details.

The present invention may be presented in various forms, and some embodiments are to be described below.

Figure 1:
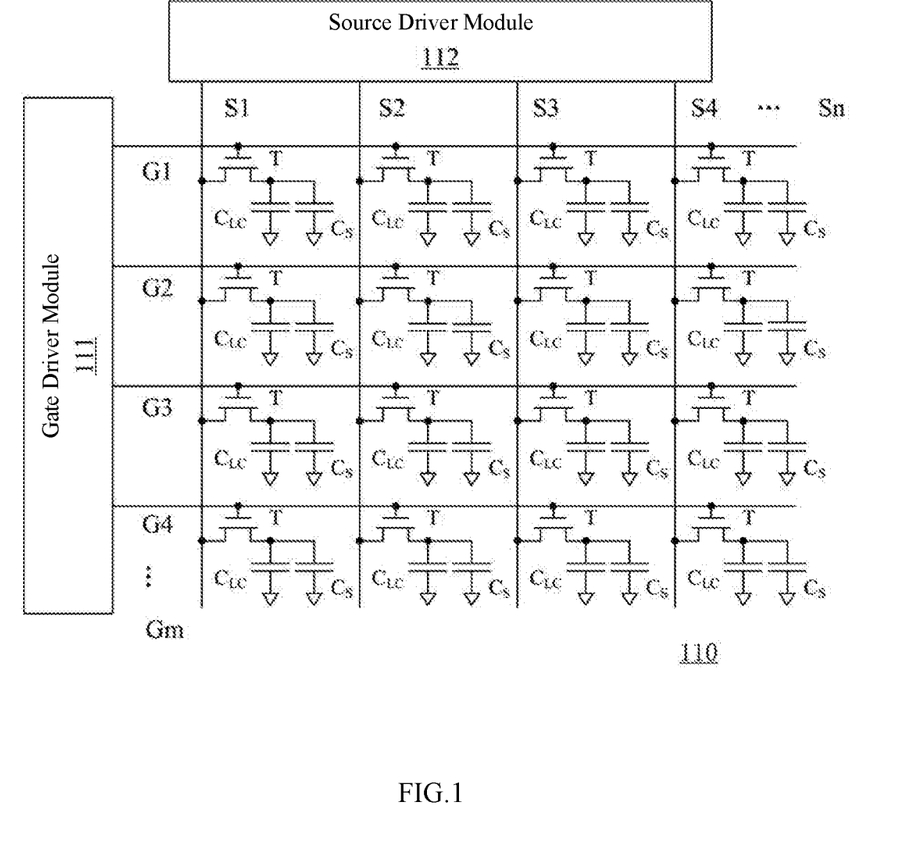
FIG. 1 is an equivalent circuit diagram of a display apparatus according to an embodiment of the present invention.
Figure 2:
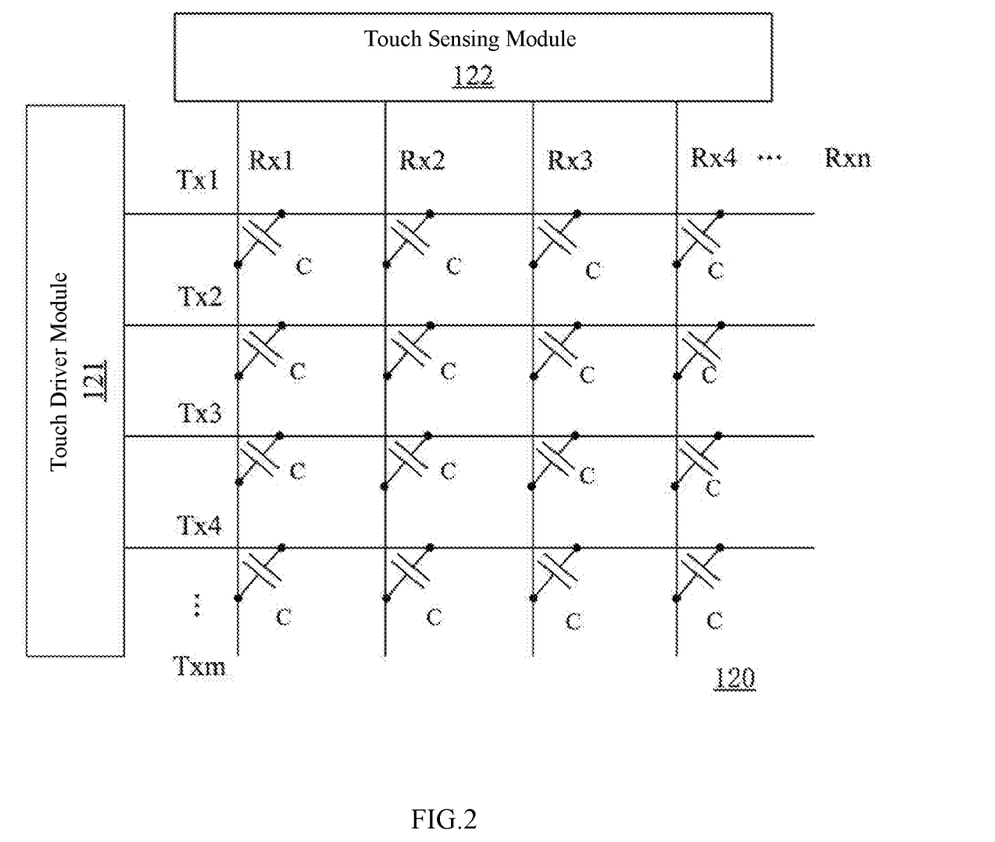
FIG. 2 is an equivalent circuit diagram of a touch control apparatus according to an embodiment of the present invention.

FIG. 1 and FIG. 2 are respectively equivalent circuit diagrams of a display apparatus and a touch control apparatus according to embodiments of the present invention.

FIG. 1 shows a display apparatus 110 according to the embodiment of the present invention by using a liquid crystal display apparatus as an example. As shown in FIG. 1, the display apparatus 110 comprises a gate driver module 111, a source driver module 112, a plurality of thin film transistors T, and a plurality of pixel capacitors $C_{LC}$. Each pixel capacitor $C_{LC}$ is formed between a corresponding pixel electrode and a common electrode. The plurality of thin film transistors T form an array. The gate driver module 111 is separately connected to gates of the thin film transistor T in corresponding rows by using a plurality of gate scanning lines G1 to Gm, and is configured to provide gate voltages G1 to Gm through scanning, so as to select and turn on thin film transistors in different rows within one image frame period. The source driver module 112 is separately connected to sources of the thin film transistors T in corresponding columns by using a plurality of source data lines S1 to Sn, and is configured to separately provide a corresponding grey-scale voltage in accordance with a grey scale to each column of the plurality of thin film transistors T when the plurality of thin film transistors T are selected and turned on row by row. Wherein, m and n are natural numbers. Each of drains of the plurality of thin film transistors T is connected to a corresponding pixel capacitor $C_{LC}$. The source driver module 112 applies the grey-scale voltage on the pixel capacitor $C_{LC}$ through a corresponding source data line and a corresponding thin film transistor T under turn-on state. The voltage on the pixel capacitor $C_{LC}$ acts on a liquid crystal molecule, so as to change an orientation of the liquid crystal molecule, to implement a light transmittance corresponding to the grey scale. In order to hold the voltage between each two pixel update periods, the pixel capacitor $C_{LC}$ may be connected to a storage capacitor Cs in parallel, to obtain a longer holding time.

In this embodiment, an internal structure and a connection relationship of the display apparatus are described by using the liquid crystal display apparatus as an example. However, the display apparatus in the present invention is not limited to the liquid crystal display apparatus.

FIG. 2 shows a touch control apparatus 120 according to the embodiment of the present invention by using capacitive touch control method as an example. As shown in FIG. 2, the touch control apparatus 120 comprises a touch driver module 121, a touch sensing module 122, and a plurality of sensing capacitors C each formed between an excitation electrode and a sensing electrode. The plurality of sensing capacitors C form an array. The touch driver module 121 is connected to the excitation electrodes in all rows through scanning lines TX1 to TXm, in order to provide excitation signals by scanning, so that the touch driver module can successively provide excitation signals to the excitation electrodes arranged in different rows within one touch-control frame period. The touch sensing module 122 is connected to the sensing electrodes in all columns through sensing lines RX1 to RXn, so as to receive an excitation signal from a corresponding column. Wherein, m and n are natural numbers. The touch driver module 121 generates, for example, alternating current signals as the excitation signals. The touch sensing module 122 receives, for example, sensing signals which are alternating current signals, detects current values based on the sensing signals, and further obtains capacitance values of the capacitors formed at cross points based on the detected current values, wherein each of these capacitors is formed at the corresponding cross point between a corresponding driver electrode and a corresponding sensing electrode, so as to determine whether there is a touch action at any cross point.

Even though wire quantities in the display apparatus and the touch control apparatus are described by using m and n as an example, it should be clear to a person skilled in the art that the foregoing is for ease of description, and the wire quantities in the display apparatus and the touch control apparatus are not necessarily the same in practical application. In addition, in this embodiment, a structure and a working principle of the touch control apparatus are described only by using mutual-capacitive touch control method as an example. However, it should be clear to a person skilled in the art that the foregoing is only one example of the touch control apparatus, but the touch control apparatus in the present invention is not limited thereto.

Figure 3:
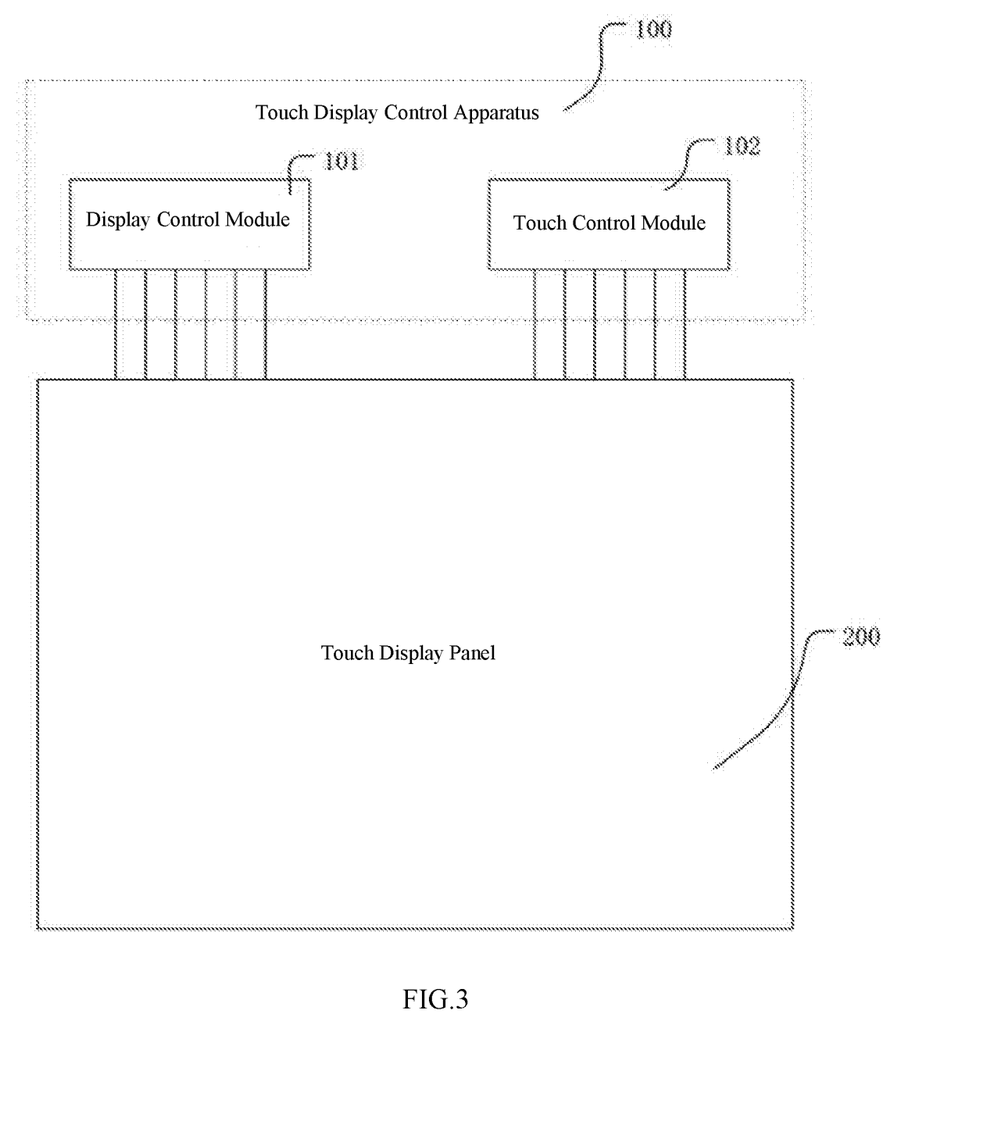
FIG. 3 is a schematic diagram of a connection structure of a touch display apparatus according to an embodiment of the present invention.

FIG. 3 is a schematic diagram of a connection structure of a touch display apparatus according to an embodiment of the present invention. As shown in FIG. 3, the touch display apparatus comprises a touch display control apparatus 100 and a touch display panel 200.

The touch display control apparatus 100 may comprise a display control module 101 and a touch control module 102. The display control module 101 may comprise the gate driver module 111 and the source driver module 112. The touch control module 102 may comprise the touch driver module 121 and the touch sensing module 122. The display control module 101 and the touch control module 102 may be achieved by separate chips, or may be integrated in one chip by using a TDDI technology, for example. Touch detection and display driving are performed in a time sharing manner.

The touch display panel 200 may comprise a touch panel and a display panel (that are not shown in the figure) that are integrated together by an integration manner. The integration manner may be selected as required, for example, on-cell or in-cell, to which the present invention is not limited to. The thin film transistors T, the pixel electrodes, the common electrode, and corresponding wires described above are disposed on the display panel. The excitation electrodes, the sensing electrodes, and corresponding wires described above are disposed on the touch panel. A connection structure between the touch display panel 200 and the touch control module 102 is specifically described below with reference to FIG. 4.

Figure 4:
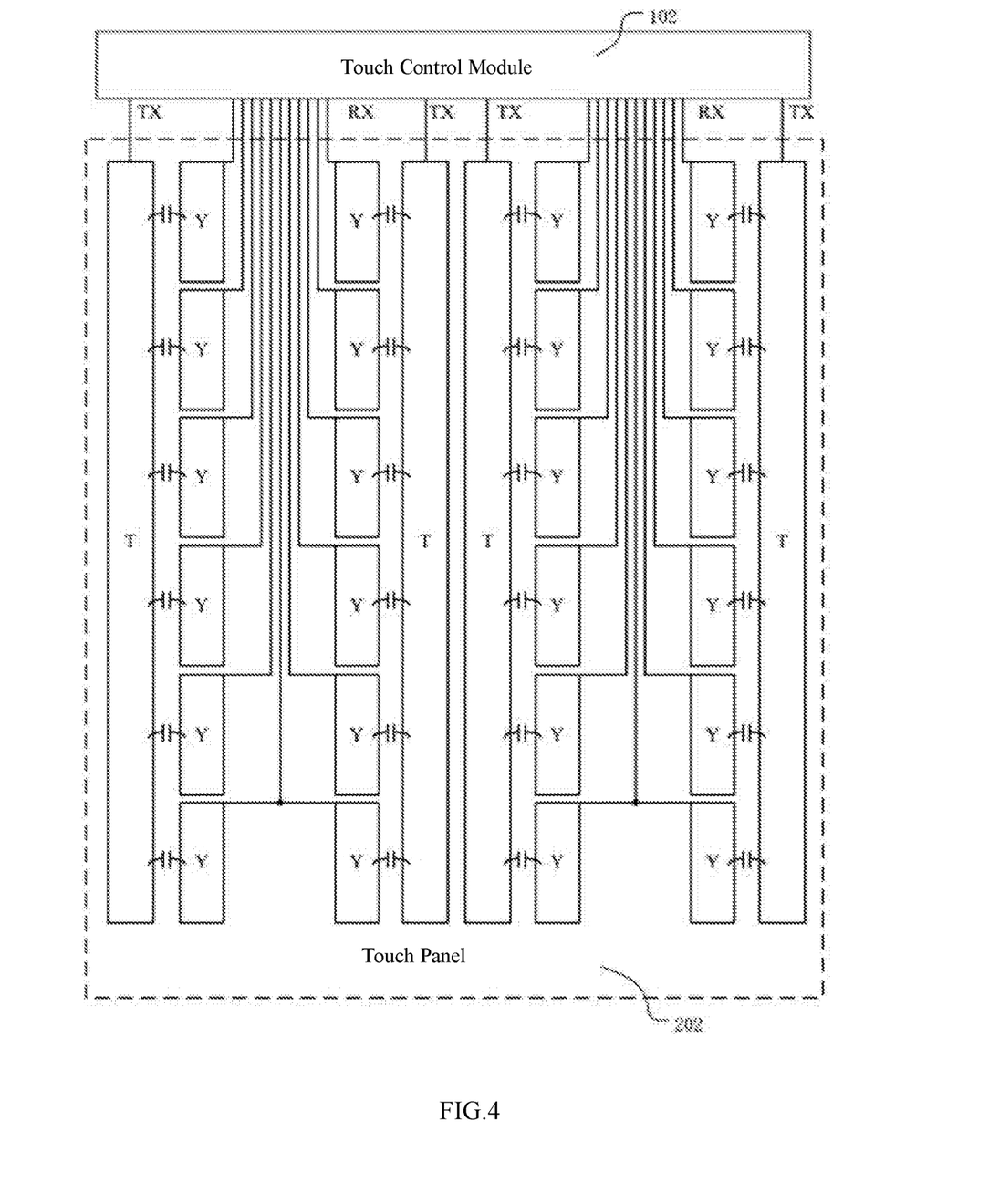
FIG. 4 is a schematic diagram of a connection structure between a touch control module and a touch panel that are in a touch display apparatus according to an embodiment of the present invention.

FIG. 4 is a schematic diagram of a connection structure between a touch control module and a touch panel which are comprised in a touch display apparatus according to an embodiment of the present invention. As shown in FIG. 4, a touch display panel in this embodiment comprises a touch panel 202, and a plurality of sensing electrodes Y and a plurality of excitation electrodes T that are arranged in an array are disposed on the touch panel 202. Capacitance of a coupling capacitor between an excitation electrode T and an sensing electrode Y that are adjacent will change due to a touch. Based on this, the touch may be detected. The excitation electrodes T and the sensing electrodes Y are separately led out from the touch panel 202 by using a plurality of touch control lines TX and RX. Specifically, the excitation electrodes T are connected to the touch control module 102 by using the plurality of scanning lines TX (specifically, the excitation electrodes T are connected to the touch driver module 121 comprised in the touch control module 102), to receive excitation signals. The sensing electrodes Y are connected to the touch control module 102 by using the plurality of sensing lines RX (specifically, the sensing electrodes Y are connected to the touch sensing module 122 in the touch control module 102), to provide touch sensing signals to the touch control module 102. The plurality of sensing lines RX connected to the touch control module 102 vary in length, and impedances of the sensing lines may not totally the same. Shapes and layout of the electrodes in FIG. 4 are merely shown as an example. The embodiments of this disclosure are not limited thereto. Other shapes and layout may be selected as required in practical application, for example, a triangle, an E shape, and any other shape can be selected. In addition, alternatively, each excitation electrode T may be used as a sensing electrode and each sensing electrode Y may be used as an excitation electrode.

Figure 5:
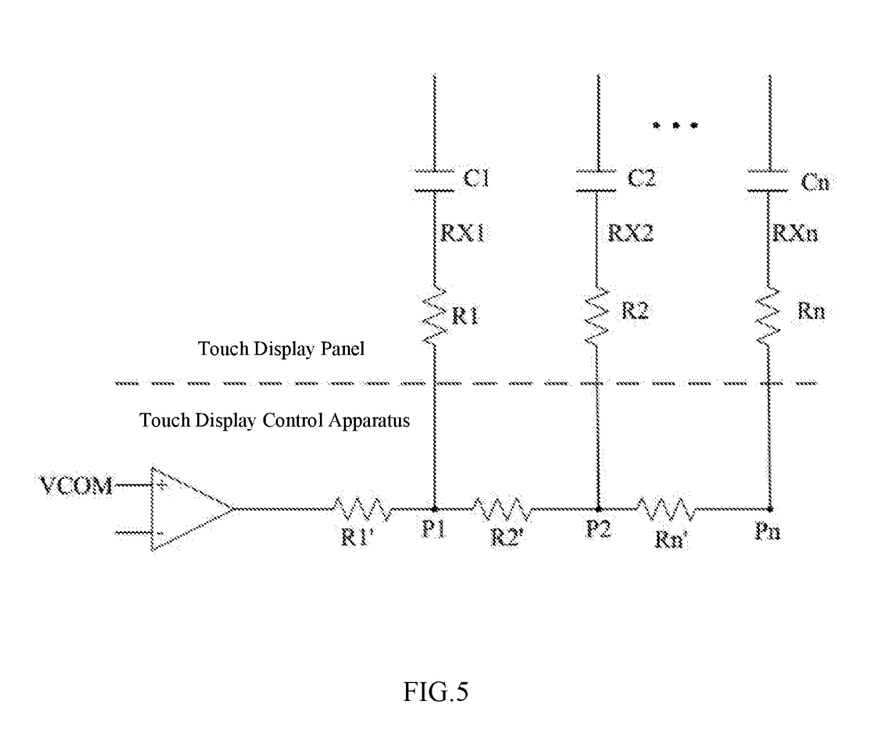
FIG. 5 is an equivalent circuit diagram of a connection point between an sensing line in a touch display panel and a touch control module in a touch display control apparatus according to an embodiment of the present invention.

Interference to a connection point between the sensing line RX and the touch control module is described below with reference to FIG. 5. FIG. 5 shows an equivalent circuit diagram of a connection point between a sensing line in the touch display apparatus 200 and the touch control module 102 in the touch display control apparatus 100 according to an embodiment of the present invention. A dashed line in the figure indicates a boundary between the touch display panel 200 and the touch display control apparatus 100. As shown in FIG. 5, C1, C2, . . . , and Cn respectively indicate coupling capacitors between excitation electrodes and sensing electrodes in the touch panel 202, and sensing lines RX1, RX2, . . . , and RXn (which are collectively referred to as sensing lines RX below) are respectively connected to the touch sensing module 122 of the touch control module 102 at nodes P1, P2, . . . , and Pn (which are collectively referred to as nodes P below). The sensing lines RX1, RX2, . . . , and RXn respectively have impedances R1, R2, . . . , and Rn (which are collectively referred to as wire impedances R below), and a connection between a common voltage output end in the touch control module 102 and the node P have impedances R1', R2', . . . , and Rn' (which are collectively referred to as switch impedances R' below). Different lengths of the sensing lines RX (shown in FIG. 4) result in different wire impedances R, thereby affecting voltages at the nodes P. In addition, existence of the switch impedances R' also affects the voltages at the nodes P. In this way, voltages at the nodes P1, P2, . . . , and Pn are inconsistent when the nodes P is connected to a common voltage VCOM during each display stage. In some extreme cases, an expected common voltage VCOM cannot be reached within a limited charging time. Consequently, a horizontal or vertical stripe may be generated on a displayed image.

Figure 6:
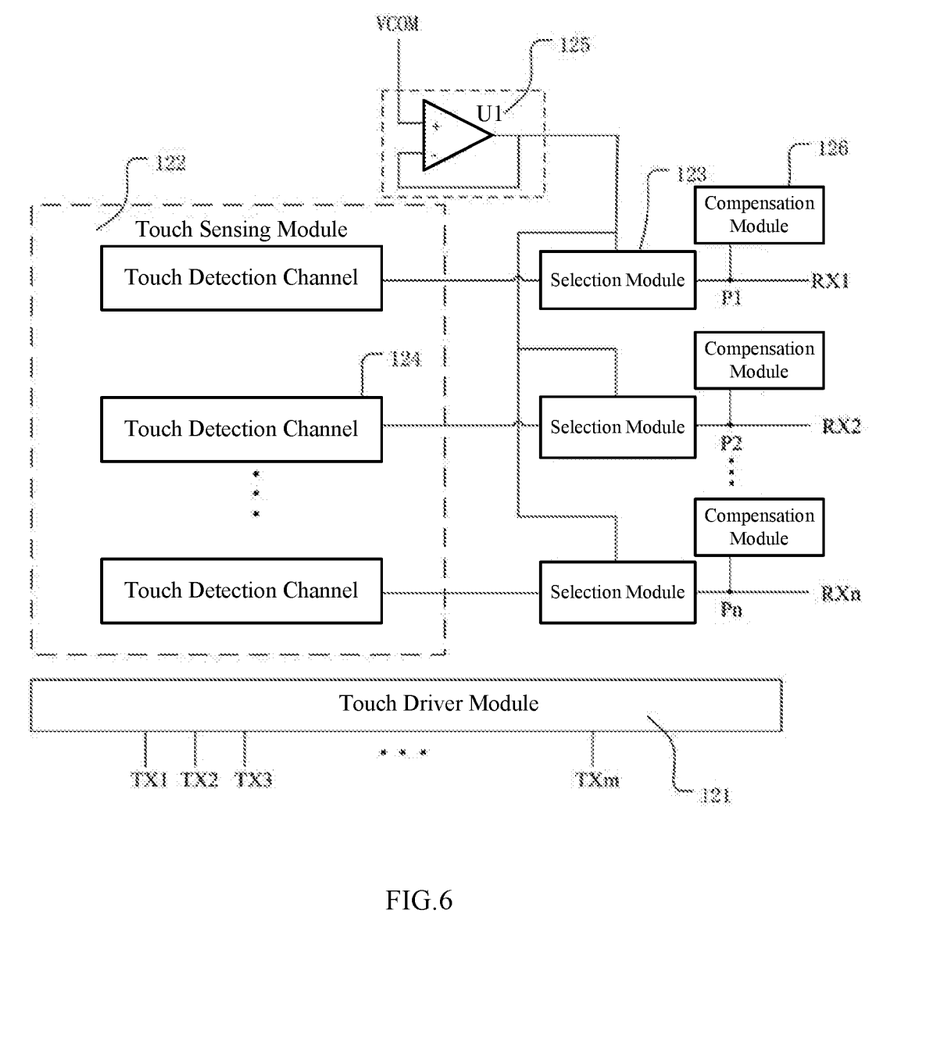
FIG. 6 is a schematic block diagram of a touch control apparatus in a touch display control apparatus according to an embodiment of the present invention.

FIG. 6 is a schematic block diagram of a touch control module in a touch display control apparatus according to an embodiment of the present invention. With reference to FIG. 1 to FIG. 5, in this embodiment, the touch display control apparatus 100 uses a TDDI technology. As shown in FIG. 6, the touch control module 102 comprises a touch driver module 121, a touch sensing module 122, a plurality of selection modules 123, a buffer module 125, and a plurality of compensation modules 126.

The touch driver module 121 applies excitation voltages on lines TX1, TX2, . . . , and TXm on a touch display panel 200 for touch scanning. The touch sensing module 122 comprises a plurality of touch detection channels 124, respectively receives touch sensing signals from the sensing lines RX1, RX2, . . . , and RXn on the touch display panel 200 through the plurality of touch detection channels 124, and performs touch detection based on the touch sensing signals.

The selection modules 123 are configured to selectively connect the touch detection channels 124 or a common voltage signal VCOM to the touch display panel. For example, each the selection module 123 may comprises a selection switch. The selection switch selects and connects one of the touch detection channel 124 or the common voltage signal VCOM to the corresponding sensing line RX on the touch display panel 200 under control of a second control signal. Specifically, during a touch detection stage, each selection module 123 connects a corresponding touch detect channel 124 to the touch display panel 200 under control of the second control signal, and the touch control module 102 receives the plurality of touch sensing signals through the plurality of touch detection channels 124, respectively, so as to perform the touch detection and determine the touch location. During the display stage, each selection module 123 connects the common voltage signal VCOM to the corresponding sensing line RX on the touch display panel 200 under control of the second control signal, and during this stage, the display control module 101 drives the touch display panel 200 to display image.

The common voltage signal VCOM is provided to the selection modules 123 through the buffer module 125. The buffer module 125 may comprise an amplifier $U_1$, a first input end (which may be a positive input end) of the amplifier $U_1$ receives the common voltage signal VCOM, and a second input end (which may be a negative input end) is connected to an output end, so that voltage buffering is performed. The output end is configured to provide the common voltage signal to the selection modules 123 and the compensation modules 126.

In this embodiment, a plurality of nodes P1, P2, . . . , and Pn (which are collectively referred to as compensation nodes P below) connecting the output end of the selection modules 123 and the plurality of sensing lines RX1, RX2, . . . , and RXn on the touch display panel 200 are served as compensation nodes, each compensation node P is connected to a corresponding compensation module 126, and each compensation module 126 is configured to counteract an interference voltage when the interference voltage coupled to a corresponding compensation node P exceeds a preset value.

A connection relationship between the modules in the present invention is described above by using a TDDI panel as an example. However, it should be clear to a person skilled in the art that the foregoing is merely for ease of description, and a touch display control apparatus in practical application does not necessarily use only the TDDI technology.

Figure 7:
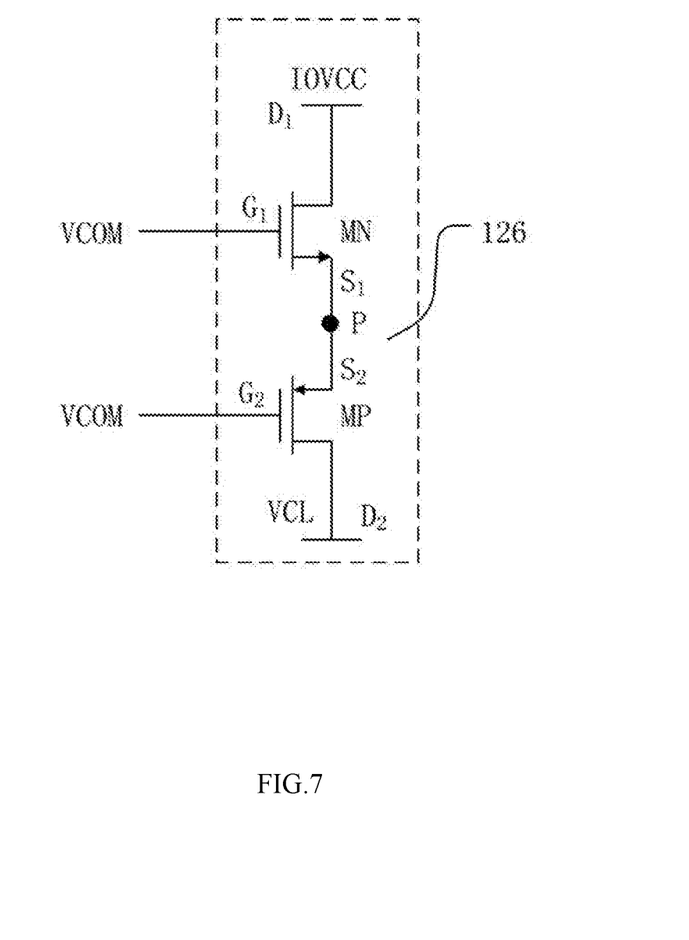
FIG. 7 is a schematic circuit diagram of a compensation module according to an embodiment of the present invention.

FIG. 7 is a schematic circuit diagram of a compensation module according to an embodiment of the present invention. As shown in FIG. 7, each compensation module 126 comprises a first transistor MN and a second transistor MP that are connected in series between a first supply voltage IOVCC and a second supply voltage VCL, the first transistor MN comprises a control electrode $G_1$, a first electrode $S_1$, and a second electrode $D_1$, and the second transistor MP comprises a control electrode $G_2$, a first electrode $S_2$, and a second electrode $D_2$. The first electrode $S_1$ of the first transistor MN and the first electrode $S_2$ of the second transistor MP are connected to each other, and are connected to a corresponding compensation node P. The second electrode $D_1$ of the first transistor MN and the second electrode $D_2$ of the second transistor MP respectively receive the first supply voltage IOVCC and the second supply voltage VCL. The control electrode $G_1$ of the first transistor MN and the control electrode $G_2$ of the second transistor MP receive a first control signal. In this embodiment, a common voltage signal VCOM is received as the first control signal. Preferably, the first supply voltage is greater than the second supply voltage. Preferably, the first supply voltage is a positive supply voltage, for example, 1.8 V; the second supply voltage is a negative supply voltage, for example, −3 V. As an example, the first supply voltage ranges between 1.8 V and 2 V, and the second supply voltage ranges between −3.3 V and −3 V. For example, the first supply voltage ranges between 2V and 3.6 V, and the second supply voltage ranges between −5 V and −3 V. Actual voltages may be determined based on a circuit requirement.

In this embodiment, the first transistor MN comprises an N-type MOS transistor, the second transistor MP comprises a P-type MOS transistor, the first electrodes are sources, the second electrodes are drains, and the control electrodes are gates.

Figure 8:
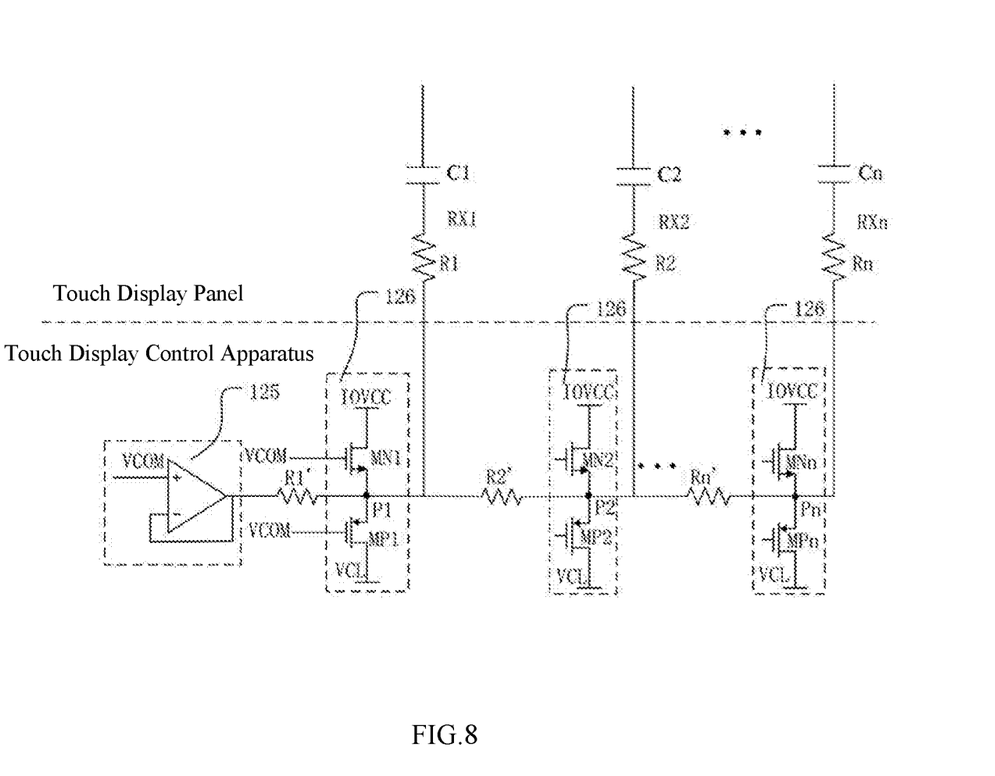
FIG. 8 is an equivalent circuit diagram of a compensation node of a touch display control apparatus according to an embodiment of the present invention.

A working principle of each compensation module in an embodiment of the present invention is described below with reference to FIG. 8. FIG. 8 is an equivalent circuit diagram of compensation nodes of a touch display control apparatus 100 according to an embodiment of the present invention. Referring to FIG. 6, each selection module 123, omitted to be shown in a module form in FIG. 8, is connected between the buffer module 125 and the corresponding compensation node (e.g., P1), and can be equivalently shown as a switch impedance (e.g., R1') in FIG. 8. As shown in FIG. 8, during a display stage, the selection modules 123 (omitted to be shown in a module form in FIG. 8) in the touch display control apparatus 100 connects, to the sensing lines RX1, RX2, . . . , and RXn on the touch display panel 200, the common voltage signal VCOM passing through the buffer module 125, and a voltage at each of the compensation nodes P1, P2, . . . , and Pn (which are collectively referred to as compensation nodes P below) is limited by the compensation module 126 to a range. For example, when the voltage between two ends of a transistor MP1 exceeds a turn-on voltage Vt_mp of the transistor MP1, which is caused by a positive voltage fluctuation at the compensation node P1, the transistor MP1 is turned on, so as to discharge the positive voltage fluctuation at the compensation node P1. Similarly, when the voltage between two ends of a transistor MN1 exceeds a turn-on voltage Vt_mn of the transistor MN1, which is caused by a negative voltage fluctuation at the compensation node P1, the transistor MN1 is turned on, so as to discharge the negative voltage fluctuation at the compensation node P1. Each one of the other compensation nodes P2 to Pn performs in a similar way. In such a manner, the compensation module 126 limits a voltage at the compensation node P to a range from VCOM−Vt_mn to VCOM+Vt_mp, so as to impact on displayed images, which is caused by the voltage fluctuation at the compensation node P, can be reduced. Therefore, smaller threshold voltages Vt_mn and Vt_mp of the transistor MN1 and the transistor MP1 lead to smaller voltage fluctuation ranges at the nodes; larger threshold voltages Vt_mn and Vt_mp of the transistor MN1 and the transistor MP1 lead to larger voltage fluctuation ranges at the nodes.

Figure 9:
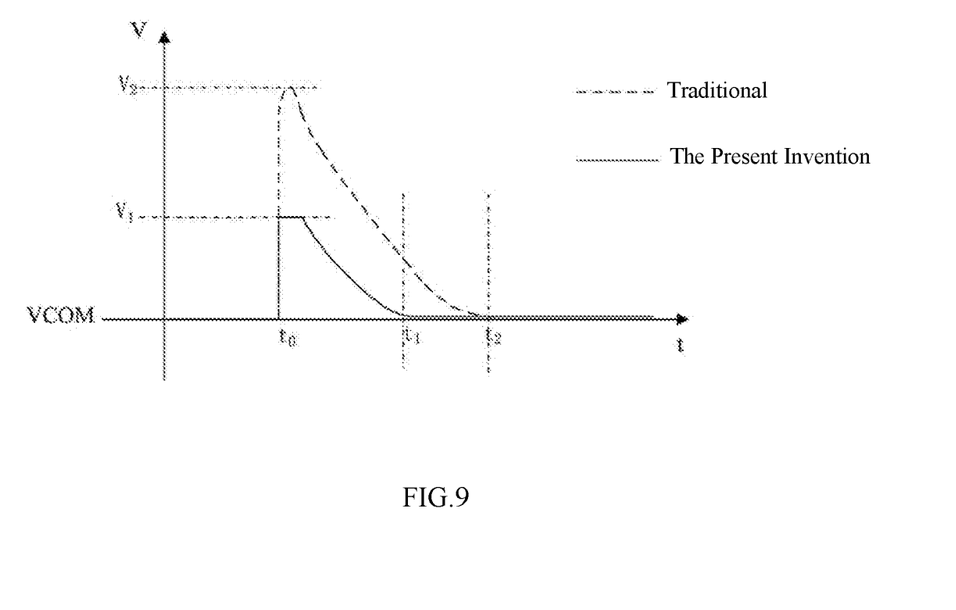
FIG. 9 is a schematic diagram of a voltage signal at a compensation node when a touch display control apparatus is switched from a touch control period to a display period according to an embodiment of the present invention.

FIG. 9 is a schematic diagram of a voltage signal at one of the compensation nodes when a touch display control apparatus is switched from a touch control stage to a display stage according to an embodiment of the present invention. In the figure, the horizontal coordinate indicates time, the vertical coordinate indicates voltage value, a dashed line indicates a voltage signal at a compensation node using a traditional technology, and a solid line indicates a voltage signal at the compensation node in this embodiment of this disclosure. As shown in FIG. 9, in the traditional technology, when switching is performed from a touch control stage to a display stage, the selection modules 123 connect VCOM to sensing lines RX, a voltage at the compensation node P starts to quickly rise from the voltage VCOM to a voltage V2 from t0, and falls back to the voltage VCOM at a moment t2. However, in this embodiment of this disclosure, the voltage at the compensation node P rises to V1 and then falls back to the voltage VCOM at a moment t1. It can be learned that, compared with the traditional technology, the voltage fluctuation range at the compensation node P in this embodiment of this disclosure is smaller, and can be more quickly stabilized at an expected level. The voltage at the compensation node P may quickly return to the common voltage VCOM within a short time, and a voltage on each sensing electrode connection line can be stabilized within an expected range, thereby reducing impact on displayed images.

According to a second aspect of the present invention, a touch display chip is provided, comprising the foregoing touch display control apparatus 100.

According to a third aspect of the present invention, a touch display apparatus is provided, comprising: a touch display panel comprising a plurality of touch control electrodes, wherein the plurality of touch control electrodes are led out from the touch display panel through a plurality of touch control lines; and the foregoing touch display control apparatus 100, wherein a touch control module is connected to the plurality of touch control lines, each touch detection channel is connected to a corresponding touch control line, and a node connecting the touch detection channel and the touch control line is used as the compensation node.

In the present invention, the compensation modules are added at the connection points between the touch display control apparatus and the touch display panel, to reduce impact of an interference voltage on image display. Each compensation module comprises a design of two transistors connected in series, and has an extremely simple structure, thereby reducing an area occupied at the node. Therefore, impact on an entire circuit is small. In addition, the compensation modules may limit the voltages at the compensation nodes to the range from VCOM−Vt_mn to VCOM+Vt_mp, the voltage fluctuation range may change with the threshold voltage of the transistors, and transistors having a relatively small threshold voltage may be selected to narrow down the voltage fluctuation range, to reduce impact of a voltage fluctuation at the compensation nodes on a displayed image. In this way, a common voltage has a consistent driving capability at each connection point, thereby avoiding a horizontal or vertical stripe during image display caused by inconsistent driving capabilities of the common voltage.

It should be noted that, in this specification, relationship terms such as one, the other, first, and second are merely used to distinguish one entity or operation from another entity or operation, and do not necessarily require or imply that any actual relationship or sequence exists between the entities or operations. Furthermore, terms "comprising", "including", or any other variants are intended to cover the non-exclusive including, thereby making that the process, method, merchandise, or device including a series of elements include not only those elements but also other elements that are not listed explicitly or inherent elements in the process, method, merchandise, or device. In the case of no more limitations, the element limited by the sentence "comprising a . . . " does not exclude that there exists another same element in the process, method, merchandise, or device including the element.

The embodiments in accordance with the present invention, as described above, are not described in detail, and are not intended to limit the present invention to be only the described specific embodiments. Obviously, many modifications and variations are possible in light of the forgoing description. These embodiments have been selected and described in detail in the specification to better explain the principles and practical application of the present invention, so that those skilled in the art can take full advantage of the present invention and modified use based on the present invention.

What is claimed is:

1. A touch display control apparatus, comprising:
   a touch control module configured to perform touch detection, wherein the touch control module comprises a plurality of touch detection channels, and performs the touch detection in accordance with a plurality of touch sensing signals which are received through the plurality of touch detection channels, respectively;
   a display control module configured to perform display control, wherein the display control module and the touch control module perform display control and touch detection in a time sharing manner; and
   a plurality of selection modules configured to connect the plurality of touch detection channels to a touch display panel for transmitting the plurality of touch sensing signals to the plurality of touch detection channels, respectively, during a touch control stage, and to transmit a common voltage signal to the touch display panel during a display stage,
   wherein the touch display panel has a plurality of nodes connecting the plurality of selection modules and serving as compensation nodes, the touch display control apparatus further comprises a plurality of compensation modules respectively connected to the compensation nodes, and each one of the plurality of compensation modules is configured to counteract an interference voltage coupled to a corresponding one of the compensation nodes when the interference voltage exceeds a preset value,
   wherein during the display stage, each one of the plurality of compensation modules is configured to determine, in accordance with a voltage difference between the common voltage signal and a voltage at the corresponding one of the compensation nodes, whether there is a positive voltage fluctuation or a negative voltage fluctuation at the corresponding one of the compensation nodes, and to discharge the determined positive voltage fluctuation or the determined negative voltage fluctuation to counteract the interference voltage.

2. The touch display control apparatus according to claim 1, wherein the touch display control apparatus is a control apparatus for a touch and display driver integration device.

3. The touch display control apparatus according to claim 1, wherein each one of the plurality of compensation modules comprises a first transistor and a second transistor that are connected in series between a first supply voltage and a second supply voltage, a first electrode of the first transistor and a first electrode of the second transistor are connected to a corresponding one of the compensation nodes, a control electrode of the first transistor and a control electrode of the second transistor receive the common voltage signal, and a second electrode of the first transistor and a second electrode of the second transistor respectively receive the first supply voltage and the second supply voltage.

4. The touch display control apparatus according to claim 1, wherein each one of the plurality of compensation modules comprises a first transistor and a second transistor that are connected in series between a first supply voltage and a second supply voltage, a first electrode of the first transistor and a first electrode of the second transistor are connected to a corresponding one of the compensation nodes, a control electrode of the first transistor and a control electrode of the second transistor receive a first control signal, and a second electrode of the first transistor and a second electrode of the second transistor respectively receive the first supply voltage and the second supply voltage.

5. The touch display control apparatus according to claim 4, wherein the first supply voltage is greater than the second supply voltage.

6. The touch display control apparatus according to claim 4, wherein the first transistor comprises an N-type MOS transistor, and the second transistor comprises a P-type MOS transistor.

7. The touch display control apparatus according to claim 6, wherein the first electrodes are sources, the second electrodes are drains, and the control electrodes are gates.

8. The touch display control apparatus according to claim 4, wherein each one of the plurality of selection modules comprises:
 a selection switch configured to connect a corresponding one of the plurality of touch detection channels or an output end of an amplifier to a corresponding one of the compensation nodes under control of a second control signal.

9. The touch display control apparatus according to claim 8, wherein the first control signal is the common voltage signal.

10. The touch display control apparatus according to claim 9, wherein the touch control module further comprises the amplifier, wherein a first input end of the amplifier receives the common voltage signal, a second input end is connected to the output end, and the output end of the amplifier is configured to provide the common voltage signal to the plurality of selection modules and the compensation modules.

11. A touch display chip, comprising the touch display control apparatus according to claim 1.

12. A touch display apparatus, comprising:
 the touch display panel comprising a plurality of touch control electrodes, wherein the plurality of touch control electrodes is led out from the touch display panel by using a plurality of touch control lines; and
 the touch display control apparatus according to claim 1, wherein the touch control module is connected to the plurality of touch control lines, each one of the plurality of touch detection channels is connected to a corresponding one of the plurality of touch control lines, and nodes connecting the plurality of touch detection channels to the plurality of touch control lines are served as the compensation nodes.

* * * * *